(12) United States Patent
Bourne et al.

(10) Patent No.: US 11,555,409 B2
(45) Date of Patent: Jan. 17, 2023

(54) PILOTED SEALING FEATURES FOR POWER TURBINE

(71) Applicant: Solar Turbines Incorporated, San Diego, CA (US)

(72) Inventors: Phillip O. Bourne, Poway, CA (US); Morgan Proffitt, San Diego, CA (US)

(73) Assignee: Solar Turbines incorporated, San Diego, CA (US)

( * ) Notice: Subject to any disclaimer, the term of this patent is extended or adjusted under 35 U.S.C. 154(b) by 0 days.

(21) Appl. No.: 17/337,221

(22) Filed: Jun. 2, 2021

(65) Prior Publication Data
US 2022/0389826 A1    Dec. 8, 2022

(51) Int. Cl.
  *F01D 11/00*  (2006.01)
  *F02C 7/28*   (2006.01)
  *F02C 7/12*   (2006.01)

(52) U.S. Cl.
  CPC .......... *F01D 11/003* (2013.01); *F01D 11/005* (2013.01); *F02C 7/28* (2013.01); *F02C 7/12* (2013.01); *F05D 2240/55* (2013.01)

(58) Field of Classification Search
  CPC ........ F01D 11/003; F01D 11/005; F02C 7/28; F02C 7/12; F05D 2240/55
  See application file for complete search history.

(56) References Cited

U.S. PATENT DOCUMENTS

| | | | |
|---|---|---|---|
| 5,343,694 A * | 9/1994 | Toborg | F01D 9/042 415/209.2 |
| 6,116,013 A * | 9/2000 | Moller | F01D 25/243 60/39.37 |
| 8,388,307 B2 | 3/2013 | Smoke et al. | |
| 9,611,760 B2 * | 4/2017 | Marino | F01D 25/246 |
| 10,196,911 B2 | 2/2019 | Jenkins et al. | |
| 2013/0154194 A1 | 6/2013 | Van Saun | |
| 2015/0241067 A1* | 8/2015 | Jause | F02C 3/04 29/890.01 |
| 2015/0361812 A1* | 12/2015 | Marino | F01D 25/30 415/214.1 |
| 2018/0230856 A1* | 8/2018 | Eastwood | F01D 25/243 |
| 2019/0218924 A1 | 7/2019 | Mulcaire | |

FOREIGN PATENT DOCUMENTS

CN    104832224 B    6/2017

* cited by examiner

*Primary Examiner* — Jesse S Bogue
(74) *Attorney, Agent, or Firm* — Procopio, Cory, Hargreaves & Savitch LLP

(57) ABSTRACT

In a gas turbine engine, coolant (e.g., cooling air) is prone to leak out of the interface between the combustor case, the nozzle of the turbine, and the exhaust diffuser. Embodiments of an interface are disclosed that provide non-fretting sealing using an interference fit between radially facing surfaces of a combustor flange and diffuser flange. In addition, one or more contact sealing lands may be used between the combustor flange and diffuser flange and one or more seals may be provided between various components of the interface to provide additional sealing.

19 Claims, 3 Drawing Sheets

PILOTED SEALING FEATURES FOR POWER TURBINE

TECHNICAL FIELD

The embodiments described herein are generally directed to turbomachinery, and, more particularly, to sealing features at the interface between a combustor and exhaust diffuser in a power turbine.

BACKGROUND

In a gas turbine engine, the interface between the combustor case and the exhaust diffuser may be subject to leakage. In particular, the temperature differential between the combustor case and the nozzle of the turbine may cause relative movement between the combustor case and the flange of the nozzle. This can cause fretting at the sealing interface between the nozzle and the combustor case. As the sealing interface wears over time, cooling air flowing between the combustor case and the turbine may leak out of the sealing interface to an external environment of the gas turbine engine, resulting in inefficiency.

U.S. Pat. No. 10,196,911 provides an example of an assembly for sealing a gap between components of a turbine engine. The present disclosure is directed toward overcoming one or more of the problems discovered by the inventors.

SUMMARY

In an embodiment, a system for a gas turbine engine is disclosed that comprises: a combustor flange comprising a first portion that extends downstream and comprises a radially inward facing surface that comprises a first pilot region at a downstream end of the radially inward facing surface; and a diffuser flange comprising a second portion that extends upstream and comprises a radially outward facing surface that comprises a second pilot region at an upstream end of the radially outward facing surface, wherein the first pilot region and the second pilot region are configured to contact each other to form an interference fit when the combustor flange is fastened to the diffuser flange.

In an embodiment, a gas turbine engine is disclosed that comprises: a combustor comprising a combustor flange at a downstream end of the combustor, wherein the combustor flange comprises a first portion that extends downstream, wherein the first portion comprises a radially inward facing surface, wherein the radially inward facing surface comprises a first pilot region at a downstream end of the radially inward facing surface, a first downstream facing surface extending radially outward and orthogonally from a downstream edge of the radially inward facing surface, and one or more contact sealing lands protruding from the first downstream facing surface, and a second downstream facing surface extending radially inward and orthogonally from an upstream edge of the radially inward facing surface; and an exhaust diffuser comprising a diffuser flange at an upstream end of the exhaust diffuser, wherein the diffuser flange is configured to be fastened to the combustor flange, and wherein the diffuser flange comprises a second portion that extends upstream, wherein the second portion comprises a radially outward facing surface, wherein the radially outward facing surface comprises a second pilot region at an upstream end of the radially outward facing surface, wherein the second pilot region is configured to contact the first pilot region to form an interference fit when the diffuser flange is fastened to the combustor flange, and a first upstream facing surface extending radially inward and orthogonally from an upstream edge of the radially outward facing surface, and a second upstream facing surface extending radially outward and orthogonally from a downstream edge of the radially outward facing surface, wherein the second upstream facing surface is configured to contact the one or more contact sealing lands when the diffuser flange is fastened to the combustor flange, wherein the second downstream facing surface of the combustor flange and the first upstream facing surface of the second portion of the diffuser flange face each other to form a space therebetween.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which.

DETAILED DESCRIPTION

Figure 1:
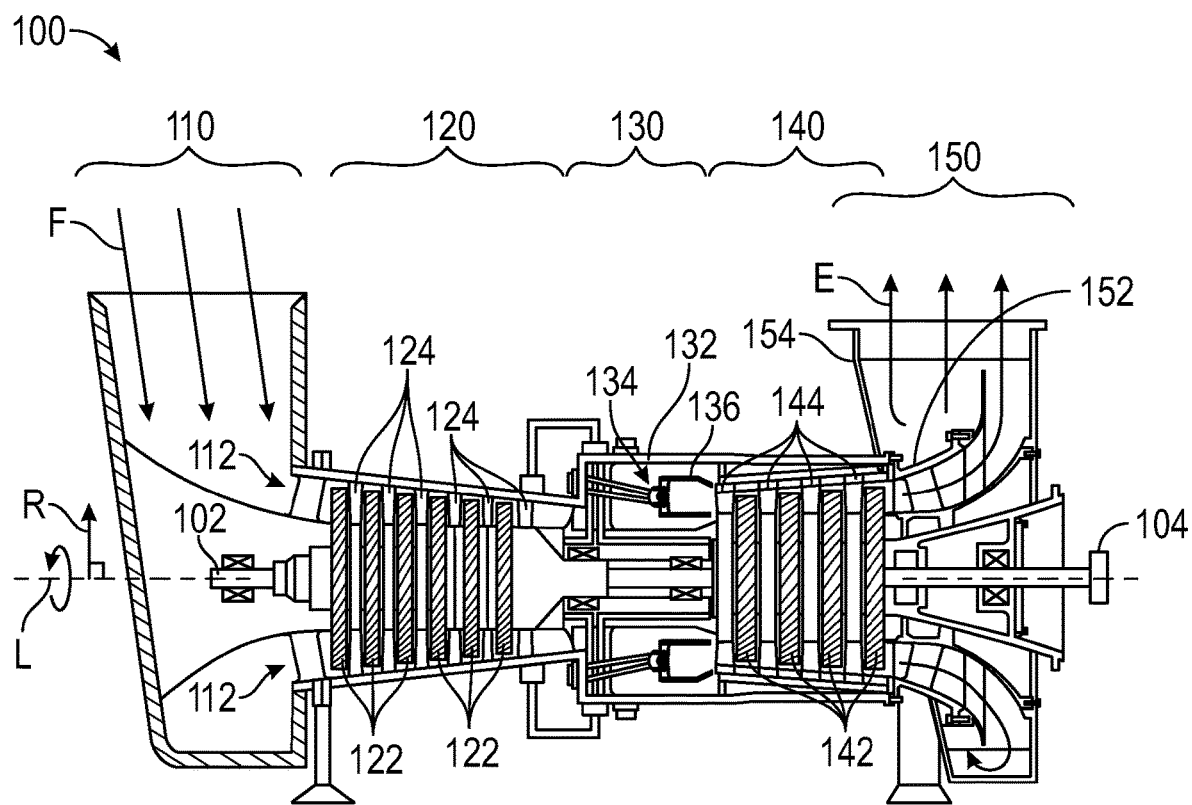
FIG. 1 illustrates a schematic diagram of a gas turbine engine, according to an embodiment.

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

For clarity and ease of explanation, some surfaces and details may be omitted in the present description and figures. In addition, references herein to "upstream" and "downstream" or "forward" and "aft" are relative to the flow direction of the primary gas (e.g., air) used in the combustion process, unless specified otherwise. It should be understood that "upstream," "forward," and "leading" refer to a position that is closer to the source of the primary gas or a direction towards the source of the primary gas, and "downstream," "aft," and "trailing" refer to a position that is farther from the source of the primary gas or a direction that is away from the source of the primary gas. Thus, a trailing edge or end of a component (e.g., a turbine blade) is downstream from a leading edge or end of the same component. Also, it should be understood that, as used herein, the terms "side," "top," "bottom," "front," "rear," "above," "below," and the like are used for convenience of understanding to convey the relative positions of various components with respect to each other, and do not imply any specific orientation of those components in absolute terms (e.g., with respect to the external environment or the ground).

In addition, it should also be understood that the various components illustrated herein are not necessarily drawn to scale. In other words, the features disclosed in various embodiments may be implemented using different relative dimensions within and between components than those illustrated in the drawings.

FIG. 1 illustrates a schematic diagram of a gas turbine engine 100, according to an embodiment. Gas turbine engine 100 comprises a shaft 102 with a central longitudinal axis L. A number of other components of gas turbine engine 100 are concentric with longitudinal axis L and may be annular to longitudinal axis L. A radial axis may refer to any axis or direction that radiates outward from longitudinal axis L at a substantially orthogonal angle to longitudinal axis L, such as radial axis R in FIG. 1. Thus, the term "radially outward" should be understood to mean farther from or away from longitudinal axis L, whereas the term "radially inward" should be understood to mean closer or towards longitudinal axis L. As used herein, the term "axial" will refer to any axis or direction that is substantially parallel to longitudinal axis L.

In an embodiment, gas turbine engine 100 comprises, from an upstream end to a downstream end, an inlet 110, a compressor 120, a combustor 130, a turbine 140, and an exhaust outlet 150. In addition, the downstream end of gas turbine engine 100 may comprise a power output coupling 104. One or more, including potentially all, of these components of gas turbine engine 100 may be made from stainless steel and/or durable, high-temperature materials known as "superalloys." A superalloy is an alloy that exhibits excellent mechanical strength and creep resistance at high temperatures, good surface stability, and corrosion and oxidation resistance. Examples of superalloys include, without limitation, Hastelloy, Inconel, Waspaloy, Rene alloys, Haynes alloys, Incoloy, MP98T, TMS alloys, and CMSX single crystal alloys.

Inlet 110 may funnel a working fluid F (e.g., the primary gas, such as air) into an annular flow path 112 around longitudinal axis L. Working fluid F flows through inlet 110 into compressor 120. While working fluid F is illustrated as flowing into inlet 110 from a particular direction and at an angle that is substantially orthogonal to longitudinal axis L, it should be understood that inlet 110 may be configured to receive working fluid F from any direction and at any angle that is appropriate for the particular application of gas turbine engine 100. While working fluid F will primarily be described herein as air, it should be understood that working fluid F could comprise other fluids, including other gases.

Compressor 120 may comprise a series of compressor rotor assemblies 122 and stator assemblies 124. Each compressor rotor assembly 122 may comprise a rotor disk that is circumferentially populated with a plurality of rotor blades. The rotor blades in a rotor disk are separated, along the axial axis, from the rotor blades in an adjacent disk by a stator assembly 124. Compressor 120 compresses working fluid F through a series of stages corresponding to each compressor rotor assembly 122. The compressed working fluid F then flows from compressor 120 into combustor 130.

Combustor 130 may comprise a combustor case 132 that houses one or more, and generally a plurality of, fuel injectors 134. In an embodiment with a plurality of fuel injectors 134, fuel injectors 134 may be arranged circumferentially around longitudinal axis L within combustor case 132 at equidistant intervals. Combustor case 132 diffuses working fluid F, and fuel injector(s) 134 inject fuel into working fluid F. This injected fuel is ignited to produce a combustion reaction in one or more combustion chambers 136. The combusting fuel-gas mixture drives turbine 140.

Turbine 140 may comprise one or more turbine rotor assemblies 142 and stator assemblies 144 (e.g., nozzles). Each turbine rotor assembly 142 may correspond to one of a plurality or series of stages. Turbine 140 extracts energy from the combusting fuel-gas mixture as it passes through each stage. The energy extracted by turbine 140 may be transferred (e.g., to an external system) via power output coupling 104.

The exhaust E from turbine 140 may flow into exhaust outlet 150. Exhaust outlet 150 may comprise an exhaust diffuser 152, which diffuses exhaust E, and an exhaust collector 154 which collects, redirects, and outputs exhaust E. It should be understood that exhaust E, output by exhaust collector 154, may be further processed, for example, to reduce harmful emissions, recover heat, and/or the like. In addition, while exhaust E is illustrated as flowing out of exhaust outlet 150 in a specific direction and at an angle that is substantially orthogonal to longitudinal axis L, it should be understood that exhaust outlet 150 may be configured to output exhaust E towards any direction and at any angle that is appropriate for the particular application of gas turbine engine 100.

Figure 2:
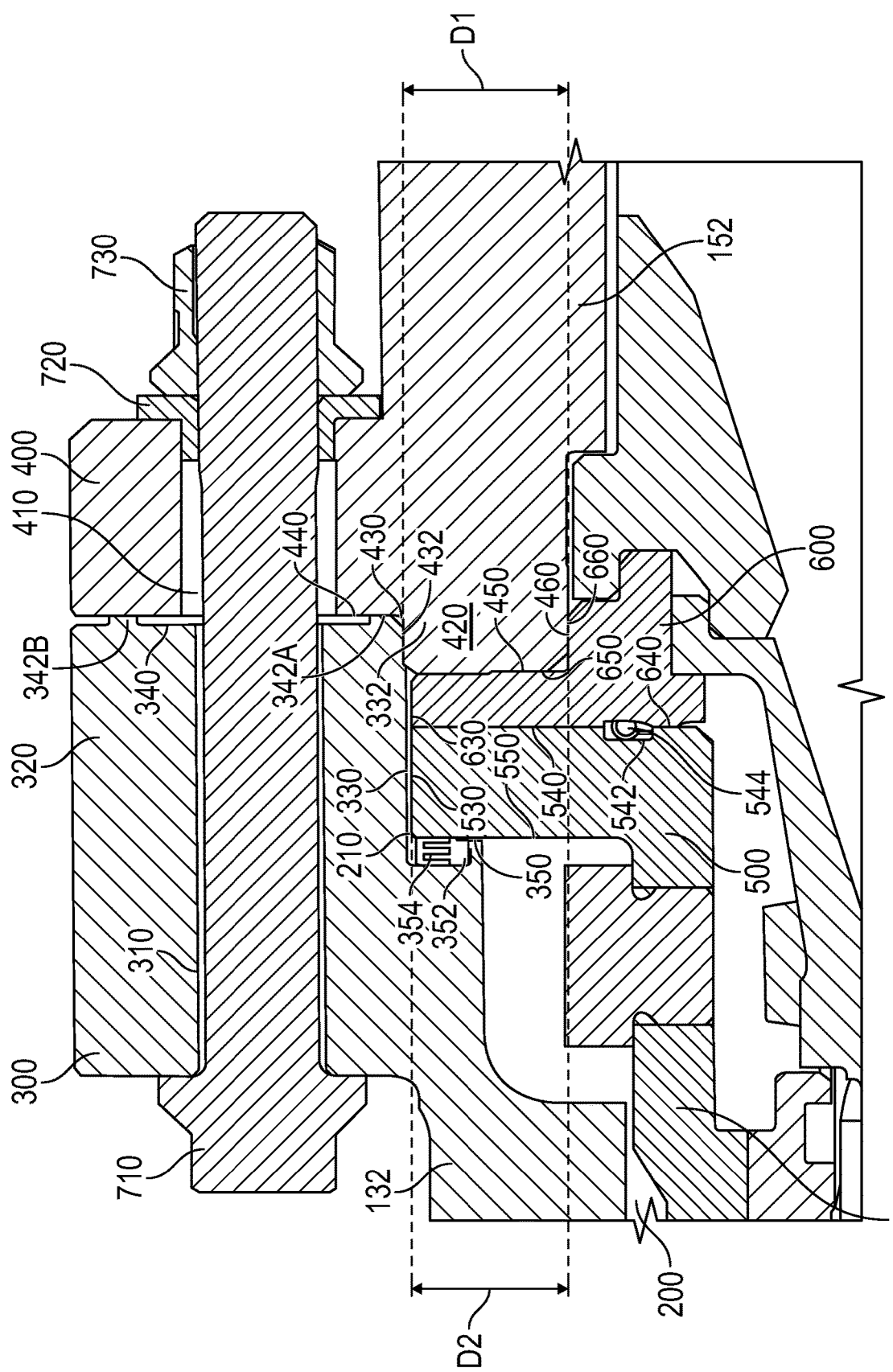
FIG. 2 illustrates a cross-sectional view of an interface between a combustor case, turbine, and exhaust diffuser, according to an embodiment.

FIG. 2 illustrates a cross-sectional view of a sealing interface between combustor case 132, turbine 140, and exhaust diffuser 152, according to an embodiment. It should be understood that, in reality, combustor case 132, turbine 140, and exhaust diffuser 152 are annular around longitudinal axis L. It should also be understood that, in FIG. 2, the left side is upstream from the right side, and the top is radially outward from the bottom.

The sealing interface may utilize a pilot feature, potentially in combination with one or more other seals, to prevent fretting between sealing components and leakage through the sealing interface. In particular, the sealing interface prevents leakage of gas from a cavity 200, representing the space between the interior surface of combustor case 132 and the exterior surface of turbine 140. In an embodiment, the gas being contained within cavity 200 is coolant that flows between combustor case 132 and turbine 140 to cool internal structures. The coolant may be air from compressor 120 that does not pass through combustor 130. Thus, the coolant is relatively cool compared to the temperature of the combusting fuel-gas mixture driving turbine 140. However, it should be understood that, as the coolant flows between combustor case 132 and turbine 140 within cavity 200, it will warm due to the heat from turbine 140.

At the downstream end of combustor case 132, combustor case 132 may comprise a combustor flange 300. Combustor flange 300 may comprise one or more apertures 310 that are axially oriented through combustor flange 300. In addition, combustor flange 300 may comprise a portion 320 that extends downstream. Portion 320 comprises a radially inward facing surface 330. Radially inward facing surface 330 comprises a pilot region 332 at the downstream end. Portion 320 also comprises a downstream facing surface 340 extending radially outward and orthogonally from the downstream edge of radially inward facing surface 330. Downstream facing surface 340 comprises one or more contact sealing lands 342 (e.g., inner contact sealing land 342A and outer contact sealing land 342B). Combustor flange 300 further comprises a downstream facing surface 350 extending radially inward and orthogonally from the upstream edge of radially inward facing surface 330. Downstream facing surface 350 may comprise a seal cavity 352 configured to hold a seal 354. It should be understood that combustor flange 300 is annular around longitudinal axis L, such that portion 320, radially inward facing surface 330 (including pilot region 332), downstream facing surface 340, contact sealing land(s) 342, downstream facing surface 350, seal cavity 352, and seal 354 are all annular as well. In addition, combustor flange 300 may comprise a plurality of apertures 310 spaced at equidistant intervals around combustor flange 300 and longitudinal axis L.

At the upstream end of exhaust diffuser 152, exhaust diffuser 152 may comprise a diffuser flange 400. Diffuser flange 400 may comprise one or more apertures 410 that are axially oriented through diffuser flange 400. In addition, diffuser flange 400 may comprise a portion 420 that extends upstream. Portion 420 comprises a radially outward facing surface 430. Radially outward facing surface 430 comprises a pilot region 432 at the upstream end. Portion 420 also comprises an upstream facing surface 450 extending radially inward and orthogonally from the upstream edge of radially outward facing surface 430, and a radially inward facing surface 460 extending downstream and orthogonally from the radially inner edge of upstream facing surface 450. As illustrated, radially inward facing surface 460 is on the opposite side of portion 420 than radially outward facing surface 430. Diffuser flange 400 further comprises an upstream facing surface 440 extending radially outward and orthogonally from the downstream edge of radially outward facing surface 430. It should be understood that diffuser flange 400 is annular around longitudinal axis L, such that portion 420, radially outward facing surface 430 (including pilot region 432), upstream facing surface 440, upstream facing surface 450, and radially inward facing surface 460 are all annular as well. In addition, diffuser flange 400 may comprise a plurality of apertures 410 spaced at equidistant intervals around diffuser flange 400 and longitudinal axis L.

Apertures 410 are positioned around diffuser flange 400 at the same intervals as apertures 310 are positioned around combustor flange 300, such that, when gas turbine engine 100 is assembled, apertures 410 align with apertures 310 to form combined apertures 310/410 that extend through both combustor flange 300 and diffuser flange 400. A bolt 710 may be inserted through each combined aperture 310/410 and fixed in place by being threaded and tightened through a nut 730. A shoulder washer 720 may be positioned between the downstream facing surface of diffuser flange 400 and nut 730. Bolts 710 fasten combustor flange 300 to diffuser flange 400. In an alternative embodiment, bolts 710 could be reversed, such that the bolt head is on the downstream side of diffuser flange 400, and shoulder washer 720 and nut 730 are on the upstream side of combustor flange 300. In another alternative embodiment, a different fastening mechanism (e.g., other than bolts and nuts) may be used. The particular fastening mechanism that is used to join combustor flange 300 and diffuser flange 400 is not essential to the disclosed sealing interface.

At the downstream end of turbine 140, turbine 140 may comprise a nozzle flange 500. Nozzle flange 500 comprises a radially outward facing surface 530, a downstream facing surface 540 extending radially inward and orthogonally from the downstream edge of radially outward facing surface 530, and an upstream facing surface 550 extending radially inward and orthogonally from the upstream edge of radially outward facing surface 530. As illustrated, upstream facing surface 550 is on the opposite side of nozzle flange 500 than downstream facing surface 540. Downstream facing surface 540 of nozzle flange 500 may comprise a seal cavity 542 configured to hold a seal 544. It should be understood that nozzle flange 500 is annular around longitudinal axis L, such that radially outward facing surface 530, downstream facing surface 540, upstream facing surface 550, seal cavity 570, and seal 572 are all annular as well.

When combustor flange 300 and diffuser flange 400 are joined, a space is formed between downstream facing surface 350 of combustor flange 300 and upstream facing surface 450 of diffuser flange 400. In an embodiment, nozzle flange 500 is sized to fit within this space adjacent to downstream facing surface 350, with space remaining between downstream facing surface 540 of nozzle flange 500 and upstream facing surface 450 of portion 420 of diffuser flange 400. In such an embodiment, a clamp ring 600 may be installed, such that a portion of clamp ring 600 is seated in this remaining space.

Clamp ring 600 may comprise a radially outward facing surface 630, an upstream facing surface 640 extending radially inward and orthogonally from the upstream edge of radially outward facing surface 630, and a downstream facing surface 650 extending radially inward and orthogonally from the downstream edge of radially outward facing surface 630. As illustrated, upstream facing surface 640 is on the opposite side of nozzle flange 600 than downstream facing surface 650. It should be understood that clamp ring 600 is annular around longitudinal axis L, such that radially outward facing surface 630, upstream facing surface 640, and downstream facing surface 650 are all annular as well.

When clamp ring 600 is installed, upstream facing surface 640 of clamp ring 600 abuts downstream facing surface 540 of nozzle flange 500, radially outward facing surface 630 of clamp ring 600 is adjacent to radially inward facing surface 330 of combustor flange 300, and downstream facing surface 650 of clamp ring 600 abuts upstream facing surface 450 of portion 420 of diffuser flange 400. In an embodiment, the radial height of nozzle flange 500 and clamp ring 600 are selected such that radially outward facing surface 530 of nozzle flange 500 and radially outward facing surface 630 of clamp ring 600 lie in substantially the same plane when gas turbine engine 100 is assembled. A narrow gap 210 may exist between radially outward facing surfaces 530/630 and radially inward facing surface 330 of combustor flange 300.

In an embodiment, the axial length of portion 320 of combustor flange 300 is such that, when gas turbine engine 100 is assembled, combustor flange 300 extends farther downstream than nozzle flange 500 and clamp ring 600. Thus, pilot region 332 of radially inward facing surface 330 of portion 320 of combustor flange 300 overlaps and contacts pilot region 432 of radially outward facing surface 430 of portion 420 of diffuser flange 400. The radial depth D1 of portion 420 along a radial axis through pilot region 432 is selected such that pilot regions 332 and 432 form an interference fit that provides a seal to prevent or reduce downstream gas egress from gap 210. In particular, radially inward facing surface 460 of portion 420 of diffuser flange 400, on an opposite radial end of portion 420 than pilot region 432, contacts and forms an interference fit with radially outward facing surface 660 of clamp ring 600. The radial depth D1 between surfaces 430 and 460 of diffuser flange 400 may be slightly greater than the radial depth D2 between surfaces 630 and 660 of clamp ring 600, to create the interference fit between pilot regions 332 and 432. In other words, portion 420 of diffuser flange 400 is radially clamped between portion 320 of combustor flange 300 and clamp ring 600 to form an interference fit between pilot regions 332 and 432 that creates a downstream seal against gas egress from cavity 210.

In an embodiment, in addition to the seal provided by this interference fit between pilot regions 332 and 432, each of contact sealing land(s) 342 creates a seal. In particular, each contact sealing land 342 protrudes from downstream facing surface 340 of portion 320 of combustor flange 300 to contact upstream facing surface 440 of diffuser flange 400. In an alternative embodiment, contact sealing land(s) 342 could protrude from upstream facing surface 440 of diffuser flange 400 to contact downstream facing surface 340 of portion 320 of combustor flange 300. In either embodiment, an inner contact sealing land 342A may be provided radially inward from combined aperture 310/410, and an outer contact sealing land 342B may be provided radially outward from combined aperture 310/410. It should be understood that, in reality, each contact sealing land 342A and 342B forms an annulus around longitudinal axis L and around the entirety of downstream facing surface 340 (or upstream facing surface 440), with outer contact sealing land 342B encircling inner contact sealing land 342A. The contact between each contact sealing land 342 and the surface of the opposing flange prevents gas, which may make it through the interference fit between pilot regions 332 and 432, from egressing radially outward between downstream facing surface 340 of portion 320 of combustor flange 300 and upstream facing surface 440 of diffuser flange 400. Thus, contact sealing land(s) 342 provide additional sealing against gas leaks.

In addition, embodiments may comprise one or more additional seals to provide additional sealing against gas leaks. For example, seal 354 in seal cavity 352 of combustor flange 300 abuts upstream facing surface 550 of nozzle flange 500 to prevent or reduce gas leakage from cavity 200 into gap 210. Seal 354 may comprise an E-seal (e.g., an annular E-seal around longitudinal axis L). Experiments have demonstrated that the use of an E-seal in seal cavity 352 can reduce pressures of approximately 250 pounds per square inch (psi) in cavity 200 to approximately 10-20 psi in gap 210. Similarly, seal 544 in seal cavity 542 of nozzle flange 500 abuts upstream facing surface 640 of clamp ring 600 to prevent or reduce gas leakage from the interior of turbine 140 into gap 210. Seal 544 may comprise a C-seal (e.g., an annular C-seal around longitudinal axis L).

As described above, in an embodiment, there are at least four levels of sealing between cavity 200 and the external environment of gas turbine engine 100. In particular, from cavity 200 to the external environment, seal 354 provides a first level of sealing, the interference fit between pilot regions 332 and 432 provides a second level of sealing, inner contact sealing land 342A provides a third level of sealing, and outer contact sealing land 32B provides a fourth level of sealing. Similarly, between the nozzle end of turbine 140, seal 544 provides a first level of sealing, the interference fit between pilot surfaces 332 and 432 provides a second level of sealing, inner contact sealing land 342A provides a third level of sealing, and outer contact sealing land 342B provides a fourth level of sealing.

Figure 3:
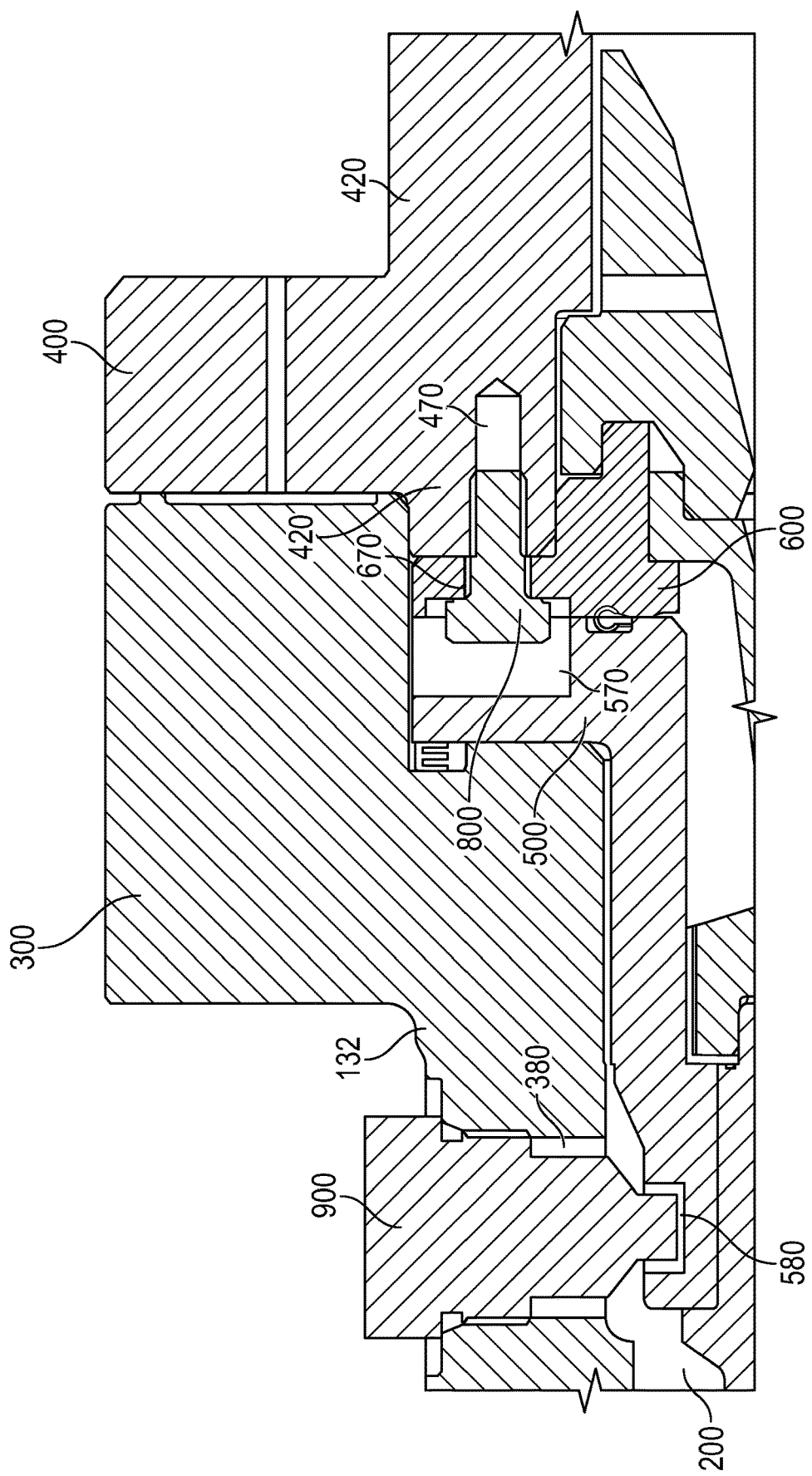
FIG. 3 illustrates a cross-sectional view of the sealing interface in a different cut plane, according to an embodiment.

FIG. 3 illustrates a cross-sectional view of a sealing interface between combustor case 132, turbine 140, and exhaust diffuser 152, in a different cut plane than FIG. 2 and with a field of view that is extended in both axial directions, according to an embodiment. In this cut plane, apertures 310/410 are no longer visible. However, a bolt cavity 570 in nozzle flange 500, a bolt aperture 670 in clamp ring 600, and a bolt aperture 470 in diffuser flange 400 are visible in this cut plane. In addition, a pin aperture 380 in combustor case 132 and a pin cavity 580 in nozzle flange 500 are also visible in this cut plane. It should be understood that pluralities of bolt cavities 570, bolt apertures 670, bolt apertures 470, pin apertures 380, and pin cavities 580 may each be spaced at equidistant intervals around longitudinal axis L. For example, each plurality may comprise six of its respective apertures or cavities, spaced at 60-degree intervals around longitudinal axis L.

Bolt cavities 570, bolt apertures 670, and bolt apertures 470 may each be spaced at the same intervals, such that, when gas turbine engine 100 is assembled, each bolt cavity 570 aligns with a corresponding bolt aperture 670 and bolt aperture 470 to form a combined cavity that extends axially from a downstream portion of nozzle flange 500 through clamp ring 600 and through an upstream portion of diffuser flange 400. An anchor bolt 800 may be seated in each combined cavity, with the bolt head positioned in bolt cavity 570, and the bolt shank positioned through bolt aperture 670 and in bolt aperture 470. In an alternative embodiment, the sequence of bolt cavity 570, bolt aperture 670, and bolt aperture 470 could be reversed, such that diffuser flange 400 comprises a bolt cavity and nozzle flange 500 comprises a bolt aperture, such that the bolt head is positioned in the bolt cavity of diffuser flange 400, and the bolt shank is positioned through bolt aperture 570 and in the bolt aperture of nozzle flange 500. Anchor bolt 800 anchors nozzle flange 500, clamp ring 600, and diffuser flange 400 together.

Pin apertures 380 and pin cavities 580 may each be spaced at the same intervals, such that, when gas turbine engine 100 is assembled, each pin aperture 380 aligns with a pin cavity 580 to form a combined cavity that extends radially through an external radially outward facing surface of combustor case 132 through an internal radially inward facing surface of combustor case 132, through cavity 200, through a radially outward facing surface of the nozzle of turbine 140 and partially into the nozzle of turbine 140. A retainer pin 900 may be seated in each combined cavity, with the pin head positioned outside combustor case 132 and the other end of the pin positioned in pin cavity 580. Retainer pins 900 fix the position of combustor case 132 with respect to the nozzle of turbine 140.

INDUSTRIAL APPLICABILITY

In a gas turbine engine, coolant (e.g., cooling air) is prone to leak out of the interface between the combustor case, the turbine nozzle, and the exhaust diffuser. Embodiments of an interface are disclosed that provide multiple levels of sealing using one or more seals, a pilot feature comprising an interference fit, and one or more contact sealing lands.

In addition, the pilot feature is oriented to prevent fretting that could cause the seal to deteriorate over time and use. For example, during operation of gas turbine engine 100, the material of exhaust diffuser 150 may grow significantly hotter than the material of combustor case 132. This may cause exhaust diffuser 150 to expand radially, relative to combustor case 132. However, because the interference fit between pilot regions 332 and 432 is axially oriented (e.g., as opposed to radially oriented), this radial expansion does not create fretting between pilot regions 332 and 432. Rather as exhaust diffuser 150 expands radially, pilot region 432 of diffuser flange 400 will carry pilot region 332 of combustor flange 300 radially outward with it.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of turbomachine. Hence, although the present embodiments are, for convenience of explanation, depicted and described as being implemented in a gas turbine engine, it will be appreciated that it can be implemented in various other types of engines and machines with turbines, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A system for a gas turbine engine, the system comprising:
   a combustor flange comprising a first portion that extends downstream and comprises a radially inward facing surface that comprises a first pilot region at a downstream end of the radially inward facing surface; and
   a diffuser flange comprising a second portion that extends upstream and comprises a radially outward facing surface that comprises a second pilot region at an upstream end of the radially outward facing surface,
   wherein the first pilot region and the second pilot region are configured to contact each other to form an interference fit when the combustor flange is fastened to the diffuser flange,
   wherein the first portion further comprises a downstream facing surface extending radially outward and orthogonally from a downstream edge of the radially inward facing surface, wherein the diffuser flange further comprises an upstream facing surface extending radially outward and orthogonally from a downstream edge of the radially outward facing surface, and wherein the first portion comprises one or more contact sealing lands, protruding from the downstream facing surface of the first portion of the combustor flange, that are configured to contact the upstream facing surface of the diffuser flange when the combustor flange is fastened to the diffuser flange.

2. The system of claim 1, wherein the one or more contact sealing lands comprise an inner contact sealing land and an outer contact sealing land that encircles the inner contact sealing land.

3. The system of claim 1, wherein the combustor flange comprises a downstream facing surface extending radially inward and orthogonally from an upstream edge of the radially inward facing surface.

4. The system of claim 3, wherein the second portion of the diffuser flange further comprises an upstream facing surface extending radially inward and orthogonally from an upstream edge of the radially outward facing surface, wherein, when the combustor flange is fastened to the diffuser flange, a space is formed between the downstream facing surface of the combustor flange and the upstream facing surface of the second portion of the diffuser flange.

5. The system of claim 4, further comprising a nozzle flange configured to fit in the space between the downstream facing surface of the combustor flange and the upstream facing surface of the second portion of the diffuser flange.

6. The system of claim 5, wherein the downstream facing surface of the combustor flange comprises a seal cavity configured to hold a seal, such that the seal abuts an upstream facing surface of the nozzle flange.

7. The system of claim 6, further comprising the seal, wherein the seal is an E-seal.

8. The system of claim 5, further comprising a clamp ring, wherein a portion of the clamp ring is configured to fit in the space between the downstream facing surface of the combustor flange and the upstream facing surface of the second portion of the diffuser flange, while an upstream facing surface of the clamp ring abuts a downstream facing surface of the nozzle flange.

9. The system of claim 8, wherein the downstream facing surface of the nozzle flange comprises a seal cavity configured to hold a seal between the nozzle flange and the clamp ring.

10. The system of claim 9, wherein the seal is a C-seal.

11. The system of claim 8, wherein the downstream facing surface of the nozzle flange comprises a plurality of bolt cavities, wherein the clamp ring comprises a plurality of first bolt apertures extending axially through the clamp ring, and wherein the diffuser flange comprises a plurality of second bolt apertures through the upstream facing surface of the second portion of the diffuser flange, and wherein the plurality of bolt cavities, plurality of first bolt apertures, and plurality of second bolt apertures are aligned to form combined cavities that are each configured to receive a bolt.

12. The system of claim 5, further comprising:
   a combustor case comprising the combustor flange, wherein the combustor case comprises a plurality of radial pin apertures through the combustor case; and
   a nozzle comprising the nozzle flange, wherein the nozzle comprises a plurality of pin cavities in a radially outward facing surface of the nozzle,
   wherein the plurality of radial pin apertures and the plurality of pin cavities are aligned to form combined apertures that are each configured to receive a pin.

13. A gas turbine engine comprising the system of claim 1.

14. A gas turbine engine comprising:
   a combustor comprising the combustor flange of claim 1; and
   an exhaust diffuser comprising the diffuser flange of claim 1,
   wherein the exhaust diffuser is positioned downstream from the combustor.

15. The gas turbine engine of claim 14, further comprising:
   a compressor upstream from the combustor; and
   a turbine between the combustor and the exhaust diffuser,
   wherein the combustor comprises a combustor case that encircles the turbine and defines a cavity around the turbine, and
   wherein the compressor provides a flow of coolant through the cavity.

16. A gas turbine engine comprising:
   a combustor comprising a combustor flange at a downstream end of the combustor, wherein the combustor flange comprises
      a first portion that extends downstream, wherein the first portion comprises
         a radially inward facing surface, wherein the radially inward facing surface comprises a first pilot region at a downstream end of the radially inward facing surface,
         a first downstream facing surface extending radially outward and orthogonally from a downstream edge of the radially inward facing surface, and
         one or more contact sealing lands protruding from the first downstream facing surface, and a second downstream facing surface extending radially inward and orthogonally from an upstream edge of the radially inward facing surface; and an exhaust diffuser comprising a diffuser flange at an upstream end of the exhaust diffuser, wherein the diffuser flange is configured to be fastened to the combustor flange, and wherein the diffuser flange comprises a second portion that extends upstream, wherein the second portion comprises a radially outward facing surface, wherein the radially outward facing surface comprises a second pilot region at an upstream end of the radially outward facing surface, wherein the second pilot region is configured to contact the first pilot region to form an interference fit when the diffuser flange is fastened to the combustor flange, and a first upstream facing surface extending radially inward and orthogonally from an upstream edge of the radially outward facing surface, and a second upstream facing surface extending radially outward and orthogonally from a downstream edge of the radially outward facing surface, wherein the second upstream facing surface is configured to contact the one or more contact sealing lands when the diffuser flange is fastened to the combustor flange, wherein the second downstream facing surface of the combustor flange and the first upstream facing surface of the second portion of the diffuser flange face each other to form a space therebetween.

17. The gas turbine engine of claim 16, further comprising a turbine, wherein the turbine comprises an outlet nozzle, wherein the outlet nozzle comprises a nozzle flange configured to fit within the space between the second downstream facing surface of the combustor flange and the first upstream facing surface of the second portion of the diffuser flange, wherein the combustor comprises a combustor case that encircles the turbine and defines a cavity around the turbine, and wherein the second downstream facing surface of the combustor flange comprises a seal cavity configured to hold a seal, such that the seal abuts an upstream facing surface of the nozzle flange and seals a space between the cavity and the interference fit.

18. The gas turbine engine of claim 17, further comprising a clamp ring, wherein a portion of the clamp ring is configured to fit in the space between the second downstream facing surface of the combustor flange and the first upstream facing surface of the second portion of the diffuser flange, while an upstream facing surface of the clamp ring abuts a downstream facing surface of the nozzle flange, and wherein the downstream facing surface of the nozzle flange comprises a seal cavity configured to hold a seal between the nozzle flange and the clamp ring.

19. The gas turbine engine of claim 16, wherein the one or more contact sealing lands comprise an inner contact sealing land and an outer contact sealing land that encircles the inner contact sealing land.

* * * * *